Jan. 31, 1956 T. R. THOMAS 2,732,915
LUBRICATION
Filed July 3, 1951 4 Sheets-Sheet 1

INVENTOR
*Thomas R. Thomas*
BY
*Dean Fairbank & Hirsch*
ATTORNEYS

Jan. 31, 1956 T. R. THOMAS 2,732,915
LUBRICATION

Filed July 3, 1951 4 Sheets-Sheet 2

INVENTOR
*Thomas R. Thomas*
BY
*Dean Fairbank & Hirsch*
ATTORNEYS

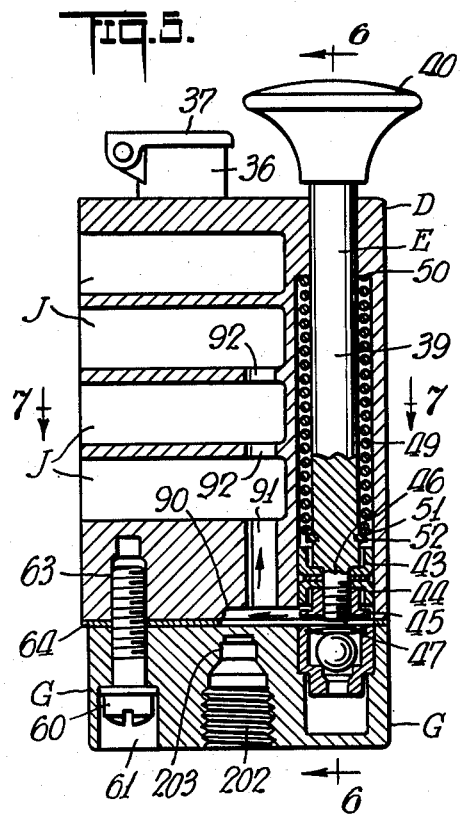

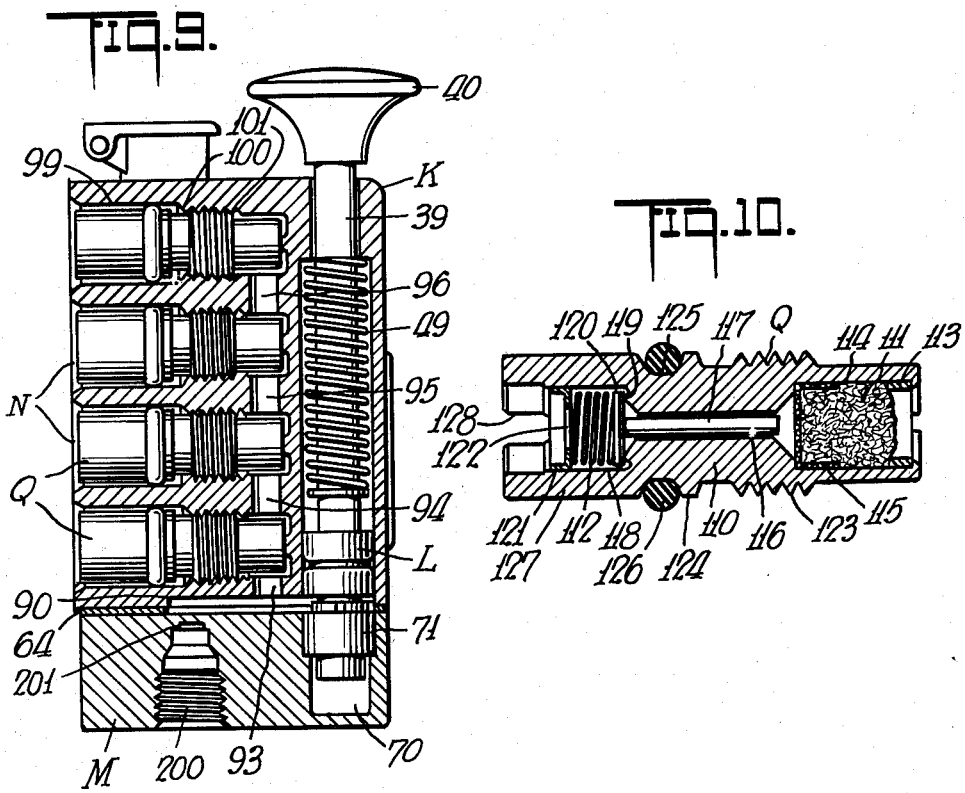

United States Patent Office 2,732,915
Patented Jan. 31, 1956

2,732,915

LUBRICATION

Thomas R. Thomas, New York, N. Y.

Application July 3, 1951, Serial No. 235,021

10 Claims. (Cl. 184—7)

The present invention relates to a lubricating installation and it particularly relates to a lubricating installation for a small hand-operated machine. Although not specifically limited thereto the present invention will be particularly described in its application to the lubrication of a cloth cutting machine.

The present invention will be particularly described in its application to a lubricating installation designed to be unitarily or integrally installed upon a small manually operated machine in which a plurality of spaced and distributed bearings are to receive equally proportioned relatively minute quantities of lubricant at spaced intervals depending upon the operation of the machine.

It is among the objects of the present invention to provide a compact, reliable, readily installed lubricating installation of the character described, which will not interfere with the operation of the machine, and which will assure reliable lubrication thereof during its operation.

Another object is to provide a lubricating installation for a unitary or integral association with a small manually operated machine, such as a cloth cutting machine, which will not add substantially to the bulk of such machine nor the weight thereof, which will not interfere with the manual operation thereof, and which will also give reliable lubrication at spaced intervals.

Another object is to provide a small, compact, readily installed lubricant pump arrangement which may be readily utilized as equipment on a manually operated machine without substantially increasing the weight or bulk thereof, and which will readily adapt itself to manual operation.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most suitable, according to one embodiment of the present invention, to provide an integral pump unit which will have both a lubricant reservoir and also carry a series of recesses to receive a reciprocatory pump plunger as well as a plurality of high restriction flow metering outlets.

In one preferred embodiment of the present invention the reservoir body or housing has a vertical elongated recess at one corner thereof to receive the pump plunger, and adjacent at the side of the pump are positioned a series of transverse recesses into which there may be inserted flow metering outlets. These outlets may be connected by tail pipes to various bearings in and about the machine to be lubricated. It has been found most satisfactory to provide a manually operated pump and to provide a closure for the reservoir which will also serve to receive a filter member.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Fig. 5 is a vertical transverse sectional view of the pump unit showing the pump plunger as well as the recesses to receive the flow metering outlets taken upon the line 5—5 of Fig. 2, and upon an enlarged scale as compared to Fig. 2.

Fig. 6 is a vertical transverse sectional view taken upon the line 6—6 of Fig. 5 showing the reservoir and the strainer units.

Fig. 7 is a transverse horizontal sectional view taken upon the line 7—7 of Fig. 5.

Fig. 8 is a fragmentary transverse sectional view showing an alternative check valve arrangement.

Fig. 9 is a transverse vertical sectional view of an alternative form of pump construction similar to Fig. 5, but showing tapped sockets for receiving threaded high restriction flow metering outlets.

Fig. 10 is a longitudinal sectional view of a high restriction flow metering outlet which may be utilized in the pump installation of Fig. 9.

Figure 1:
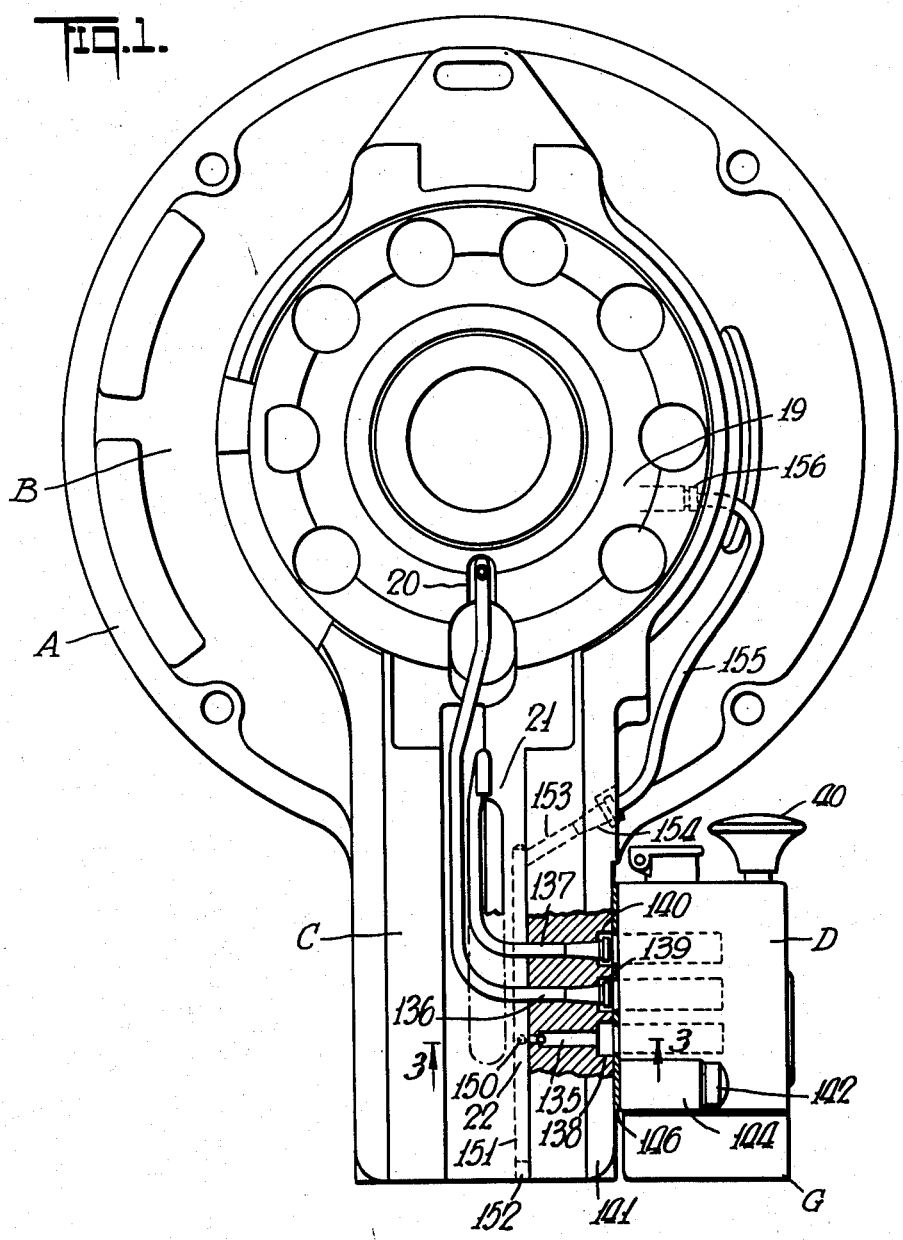
Fig. 1 is a front elevational view of a machine to which the lubricating installation of the present invention may be applied, showing the outlets from the pump partly in section.
Figure 2:
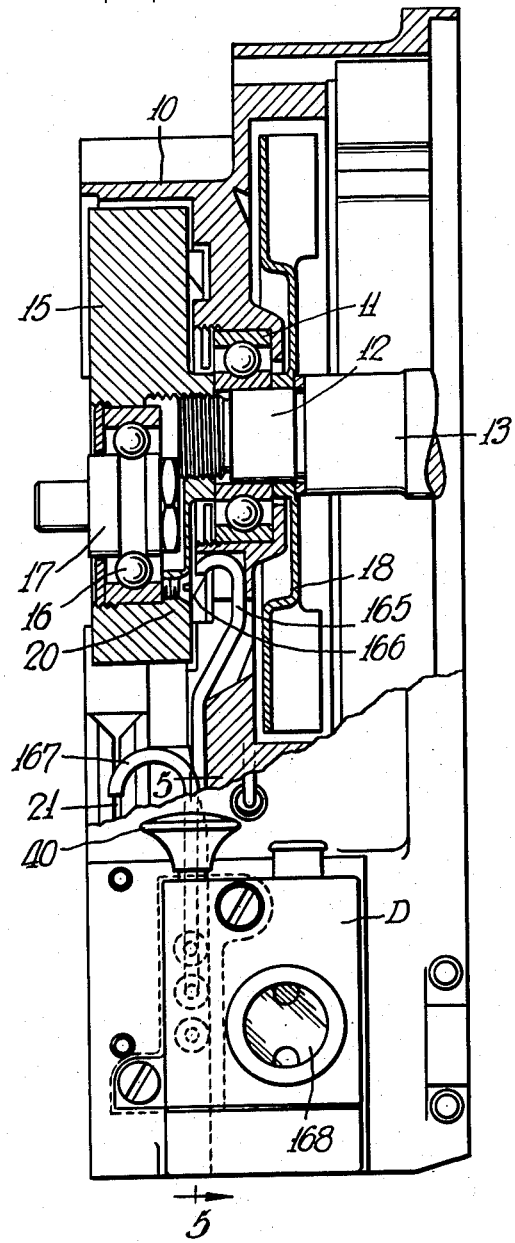
Fig. 2 is a side elevational view of the assembly as shown in Fig. 1 partly in section to show the various detail pipe connections dripping upon the bearings to be lubricated.
Figure 3:
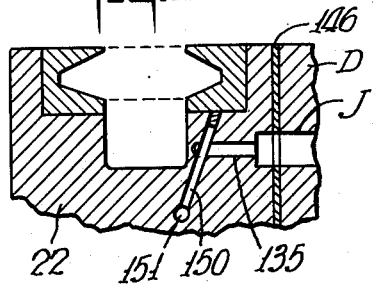
Fig. 3 is a fragmentary section upon an enlarged scale taken upon the line 3—3 of Fig. 1.

Referring to Figs. 1 and 2, there is shown a cloth cutting machine unit A having a head portion B and a depending slide portion C.

As shown in Figs. 5 to 8, the pump D may have a piston unit E, a reservoir recess F, and a closure G which receives the strainer H.

On one side of the reservoir there are a plurality of recesses J for receiving flow metering outlet fittings.

In the embodiment of Figs. 9 and 10, there is shown a reservoir K with a pump L and a closure M. The recesses N may receive the flow metering outlet fittings Q.

Referring particularly to Figs. 1 and 2, the main structure 10 is provided with a ball-bearing 11 for the reduced diameter end portion 12 of the shaft 13. In the face element 15 there is positioned the ball-bearing 16 for the stub shaft 17.

The fan 18 is positioned to the right of the bearing 11.

As shown in Figs. 1 to 4, the structures located at 19, 20, 21 and 22 are to be lubricated from the pump D. The pump D consists of a rectangular casting having the top wall 30, the side walls 31, 32, 33 and 34, and the open base 35. The top wall 30 has an opening receiving the filler sleeve 36 with the snap cover 37. It also has a vertical bore 38 for receiving the shaft 39 of the piston E. The piston E has a manual actuating button 40.

The bore 38 leads into the enlarged recess 41 which forms the pump cylinder to receive the enlarged piston 42. The piston 42 has the ceiling cups 43 and 44 which are clamped together by the nut 45 on the shoulder 46 of the piston rod 39. The end of the piston rod 39 is threaded as indicated at 47 to receive the nut 45.

The piston rod 39 is encircled by the return spring 49 which is compressed upon upward stroke of the piston 42.

The upper end of the spring 49 reacts against the shoulder 50 in the recess 41. The lower end of the piston reacts upon a steel washer 51 resting in groove 52 of the piston rod 39.

The closure G of the pump D is held in position by means of bolts 60. The heads of the bolts fit in the recesses 61 in the bottom of the closure G.

The threaded shank 62 extends through the cover G and into the tapped openings 63. The gasket or gaskets 64 will assure lubricant tight connection between the closure G and the open end 35. At the closure G there is a lubricant receiving chamber 65 below the strainer H.

The strainer H consists of fibrous material 66 positioned between the screens 67 and inserted in the recess 68.

From the chamber 65 the lubricant passes through the bore 69 into the pump inlet chamber 70.

The pump inlet chamber may receive an insert 71 for the ball check 72. The ball check 72 will be held in position by the plate 73.

On the other hand, as shown in Fig. 8, the ball check 74 may co-act directly with the shoulder 75 as a valve seat and be held in position by the annular disk 76. From the ball check 72 or 74 the lubricant flows into the chamber 77 below the piston E.

The piston E upon its downstroke will force lubricant into the side channel 90 and then up into the passage 91 from which it flows into the recesses J, as indicated through the openings 92. In each of the recesses J there will be press-fitted a high restriction flow metering fitting.

One embodiment of the high restriction flow metering fitting is shown diagrammatically in Fig. 10.

As shown in Fig. 9, the pump unit has a manual actuator or operating knob 40 with a piston rod 39 and a spring 49 as in Figs. 5 and 6.

The unit of Fig. 9 will also have, similar to that of Figs. 5 and 6, a pressed-in ball check unit 71 to receive lubricant from the chamber 70 after it has passed the strainer through the bore 69. The lubricant in this case will flow from the passageway 90 through the passageways 93, 94, 95 and 96 into the chambers N which receive the flow metering units Q. These chambers have enlarged portions 99, a shoulder 100 and a tapped portion 101. The units Q to be inserted in the recesses N consist of an elongated cylindrical body 110 having inlet strainer 111, and an outlet spring seated check valve unit 112.

The strainer 111 is held in position by the ring 113 and strainer cup 115 in the socket 114. The socket opens into the bore 116 which receives the restricting pin 117. The annular passage between the bore 116 and the pin 117 will give a restricting effect. The bore 116 opens into the chamber 118 having the annular valve seat 119. The valve seat 119 co-acts with the valve 120 of the valve unit 112.

The unit 112 will be held in position by the cup 121 having the flow passage 122. The spring 103 will react against the cup 121 and press the valve 120 against its seat 119.

The body 110 is threaded at 123 to be screwed into the sockets of recess N.

The body has the enlargement 124 forming a recess 125 in which is positioned the seal ring of rubber or flexible material 126. The large end 127 of the body 110 is provided with a fillister slot 128. The fillister slot 128 enables the unit Q to be screwed into the sockets N.

The sockets J of the pump of Fig. 5 and the sockets N of the pump of Fig. 9 feed directly into the bore 135 and the tail pipes 136 and 137 through the sockets 138, 139 and 140 (see Fig. 1).

The body which receives the pump D and reservoir recess F is clamped directly on the side 141 of the slide extension C by bolts 142, extending through the opening 143 in the boss 144 and through the opening 145.

The gasket 146 will assure a lubricant tight fit.

The lubricant from the recess 138 will feed through the bore 135 into the bore 150. The bore 150 communicates with the vertical bore 151 plugged at 152.

The bore 152 will communicate with the oblique bore 153 having the compressed coupling connection 154 to the tubing 155.

Figure 4:
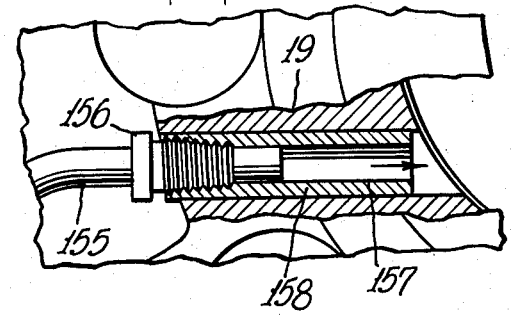
Fig. 4 is a fragmentary sectional view upon an enlarged scale of the lubricant feed of one of the bearings, as shown in Fig. 1.

The tubing 155 will lead to the compression coupling connection 156 (see Fig. 4). The tube 155 feeds lubricant into the passage 157 in the sleeve 158.

The tube 136 leads up to the gooseneck 165, drips into the passageway 166, as shown in Fig. 2, feeding the ball-bearing 16. The tube 137 leads to the gooseneck 167 which feeds the bearing at 21.

The installation shown may have any number of recesses J or N depending upon the number of bearings to be fed, and if desired, a number of these recesses may also be blocked off where all the recesses need not be used.

Depending upon the specific application, the number of metering units Q may be varied, in which case the uppermost passage 94, 95 or 96 may be blocked above the last flow metering fitting Q. This will avoid the necessity of utilizing a block to block or seal such opening or recess N.

As shown in Fig. 5, the body receiving the pump D is designed for three metering units at the maximum, while the body receiving the pump K of Fig. 9 is designed for four metering units at the maximum.

In respect to Fig. 4, it will be noted that the tube 155 and the connection 156 are shown from the other side from that shown in Fig. 1.

Access is readily had to the interior of the reservoir and piston by removing the closure G.

The entire unit may have a height of about 2 inches to 3 inches and a width of about 1 inch to 2 inches. The reservoir, pump and metering fitting are all most conveniently assembled in one single unit.

The inlet check valve may be conveniently assembled with the closure G before the closure is mounted upon the body. The reservoir capacity may be in the neighborhood of 15 to 30 cubic centimeters.

The oil window unit, as shown at 168 in Fig. 2, gives an indication of the level of the oil in the reservoir. The unit as shown is good for about 35 strokes or about one or two operations a day for a month without refilling.

The lower tapped opening 200 of Fig. 9 may be drilled through at its bottom 201 to connect to the passageway 90. In this manner an extensional tubing connection may be made to the tapped opening 200, which may be connected to supply other bearings to be lubricated through meter-units. It will be necessary to insert a suitable check valve in tapped opening 200 before connection is made to additional meter-units so that no oil will be drawn back from the tubing system when piston L is operated.

The same use may also be made of tapped opening 202 in Fig. 5. In this case the bottom 203 of the recess 202 may be drilled through to the passageway 90.

It is not necessary to insert flow metering fittings in all of the recesses J of Fig. 5 or N of Fig. 9, but if desired, the passageways 92 of Fig. 5 and 95 and 96 of Fig. 9 may be blocked off or plugged, or not drilled so that only the lower recesses will function to discharge lubricant through the flow metering fittings.

Instead of the flow metering fittings being inserted into recesses J of Fig. 5, or N of Fig. 9, it is also possible to insert fittings similar to those of Fig. 10, but which will only contain a check valve. In this way an oil passage without tubing connection can be extended inside machine member leading to a meter-unit, or plurality thereof, located near the bearing or bearings to be lubricated.

The pump can also be used with all recesses J of Fig. 5 and N of Fig. 9 plugged, or not drilled, by using tapped opening 202 in Fig. 5 or 200 in Fig. 9 as a connection to a distributing system, with a check valve in tapped openings as previously described and meter-units located externally.

As many changes could be made in the above lubrication and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed, what is claimed is:

1. A centralized lubrication installation of the high restriction flow metering outlet type for a light manually operated machine comprising a combination piston pump-reservoir-strainer meter unit assembly including in a single rectangular block, a reservoir, a strainer, a ball check, a spring returned piston and a plurality of parallel recesses on said block receiving high restriction flow metering fittings, said block having a recess serving as a cylinder to receive said piston and said block having another recess serving as said reservoir and said block having connecting flow passageways including said ball check and also including said strainer and the side of said block also having a plurality of parallel recesses in communication with said cylinder, said fittings blocking said parallel recesses, said flow passageways conducting the lubricant from the reservoir to the piston and from the piston to the recesses.

2. A centralized lubrication installation of the high restriction flow metering outlet type for a light manually operated machine comprising a combination piston pump-reservoir-strainer meter unit assembly including in a single rectangular block a reservoir, a strainer, a ball check, a spring returned piston and a plurality of parallel recesses in said block receiving high restriction flow metering fittings, said fittings being press-fitted in said parallel recesses, said block having a recess serving as a cylinder to receive said piston and said block having another recess serving as said reservoir and said block having connecting flow passageways including said ball check and also including said strainer and the side of said block also having a plurality of parallel recesses in communication with said cylinder, said fittings blocking said parallel recesses, said flow passageways conducting the lubricant from the reservoir to the piston and from the piston to the recesses.

3. A centralized lubrication installation of the high restriction flow metering outlet type for a light manually operated machine comprising a combination piston pump-reservoir-strainer meter unit assembly including in a single rectangular block a reservoir, a strainer, a ball check, a spring returned piston and a plurality of parallel recesses in said block receiving high restriction flow metering fittings, said fittings being screwed into said parallel recesses and said recesses being positioned transverse to the movement of the piston, said block having a recess serving as a cylinder to receive said piston and said block having another recess serving as said reservoir and said block having connecting flow passageways including said ball check and also including said strainer and the side of said block also having a plurality of parallel recesses in communication with said cylinder, said fittings blocking said parallel recesses, said flow passageways conducting the lubricant from the reservoir to the piston and from the piston to the recesses.

4. A centralized lubrication installation of the high restriction flow metering outlet type for a light manually operated machine comprising a combination piston pump-reservoir-strainer meter unit assembly including in a single rectangular block a reservoir, a strainer, a ball check, a spring returned piston and a plurality of parallel recesses in said block receiving high restriction flow metering fittings, said strainer and ball check being mounted in a detachable closure member, said block having a recess serving as a cylinder to receive said piston and said block having another recess serving as said reservoir and said block having connecting flow passageways including said ball check and also including said strainer and the side of said block also having a plurality of parallel recesses in communication with said cylinder, said fittings blocking said parallel recesses, said flow passageways conducting the lubricant from the reservoir to the piston and from the piston to the recesses.

5. A centralized lubrication installation of the high restriction flow metering outlet type for a light manually operated machine comprising a combination piston pump-reservoir-strainer meter unit assembly including in a single rectangular block a reservoir, a strainer, a ball check, a spring returned piston and a plurality of parallel recesses in said block receiving high restriction flow metering fittings, said restriction flow metering fittings being of the pin-in-bore type and being mounted in said recesses at one side of the pump unit and said side of the pump unit being provided with a lubricant-tight gasket connection enabling it to be in lubricant-tight fashion upon the machine to be lubricated, said block having a recess serving as a cylinder to receive said piston and said block having another recess serving as said reservoir and said block having connecting flow passageways including said ball check and also including said strainer and the side of said block also having a plurality of parallel recesses in communication with said cylinder, said fittings blocking said parallel recesses, said flow passageways conducting the lubricant from the reservoir to the piston and from the piston to the recesses.

6. A combined piston pump lubricant reservoir-flow meter unit assembly in a single block for mounting upon the side of a machine to be lubricated, said block having relatively large spaced parallel cavities for the lubricant reservoir and for the pump and also a plurality of transverse cylindrical parallel cavities, the pump cavity receiving a piston and the block being provided with a flow passageway from said reservoir to said pump cavity, a strainer and a pump inlet check valve being positioned in said passageway and said block pump being provided with an outlet flow passageway to said parallel cavities from said pump cavity and flow meter units in said parallel cavities.

7. The assembly of claim 6, said check valve, strainer and inlet passageway being positioned in a separate detachable portion of the block.

8. The assembly of claim 6, the reservoir cavity occupying a major portion of said block pump and transverse cavities having about the same diameter and being positioned alongside of said reservoir cavity.

9. The assembly of claim 6, said meter units being screwed into said transverse cavities and being provided with sealing rings to seal said cavities so that the lubricant may only flow through said meter units, said machine being provided with a plurality of recesses to receive lubricant corresponding to said parallel transverse cavities and a gasket connection between the block and the machine to enable lubricant to flow in lubricant-tight fashion from the meter units into the machine.

10. The assembly of claim 6, in which said meter units block the central portion of said transverse cavities but permit lubricant flow around the inlet and outlet ends of said cavities around the outside of said meter units.

References Cited in the file of this patent

UNITED STATES PATENTS

| | | |
|---|---|---|
| 640,079 | Bangs | Dec. 26, 1899 |
| 2,343,302 | Kocher | Mar. 7, 1944 |
| 2,351,620 | Kocher | June 20, 1944 |